April 28, 1942.　　A. J. GRANBERG ET AL　　2,281,490
FLUID METER
Filed Jan. 22, 1940　　4 Sheets-Sheet 1

INVENTORS,
ALBERT J. GRANBERG.
THOMAS A. McCOY.
BY
Lippincott & Metcalf
ATTORNEYS.

April 28, 1942.　　A. J. GRANBERG ET AL　　2,281,490
FLUID METER
Filed Jan. 22, 1940　　4 Sheets-Sheet 2

INVENTORS.
ALBERT J. GRANBERG.
THOMAS A. McCOY.
BY
Lippincott & Metcalf
ATTORNEYS.

April 28, 1942.   A. J. GRANBERG ET AL   2,281,490
FLUID METER
Filed Jan. 22, 1940   4 Sheets-Sheet 3
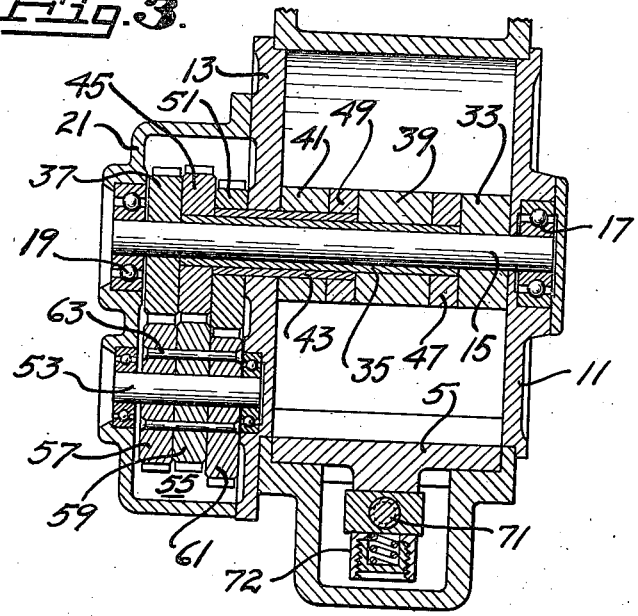
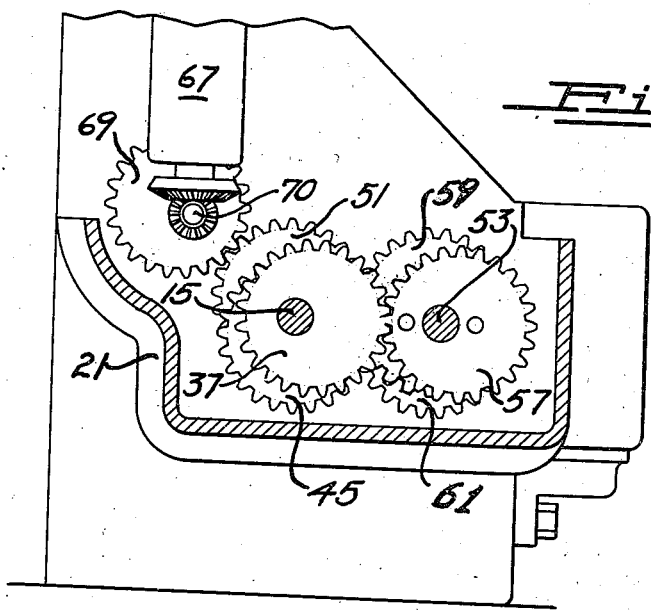
INVENTORS,
ALBERT J. GRANBERG.
THOMAS A. McCOY.
BY
Lippincott & Metcalf
ATTORNEYS.

April 28, 1942.   A. J. GRANBERG ET AL   2,281,490
FLUID METER
Filed Jan. 22, 1940   4 Sheets-Sheet 4

INVENTORS,
ALBERT J. GRANBERG.
THOMAS A. McCOY.
BY
Lippincott & Metcalf
ATTORNEYS.

Patented Apr. 28, 1942

2,281,490

UNITED STATES PATENT OFFICE 2,281,490

FLUID METER

Albert J. Granberg, and Thomas A. McCoy, Oakland, Calif., assignors to Granberg Equipment Inc., Emeryville, Calif., a corporation of California Application January 22, 1940, Serial No. 315,058

2 Claims. (Cl. 73—260)

Our invention relates to meters and more particularly to meters for measuring fluids such as oil, gasoline and the like.

Among the objects of our invention are to provide an improved meter (1) which shall have increased metering capacity, (2) which shall have a cyclic variation in the angular velocity of its blades controlled externally of the metering chamber whereby to avoid the use of an internal cage, crank pivots, or the like as has been the practice in prior art meters of similar type, (3) which shall have metering compartments completely free of obstruction, (4) which shall be of simplified construction as compared to meters of similar type known in the prior art.

Additional objects of our invention will be brought to light in the following description of the same taken in conjunction with the accompanying drawings wherein—

Figure 3 is a view in section along the line 3—3 of Figure 1.

Figure 4 is a view in section along the line 4—4 of Figure 1.

Figure 1:
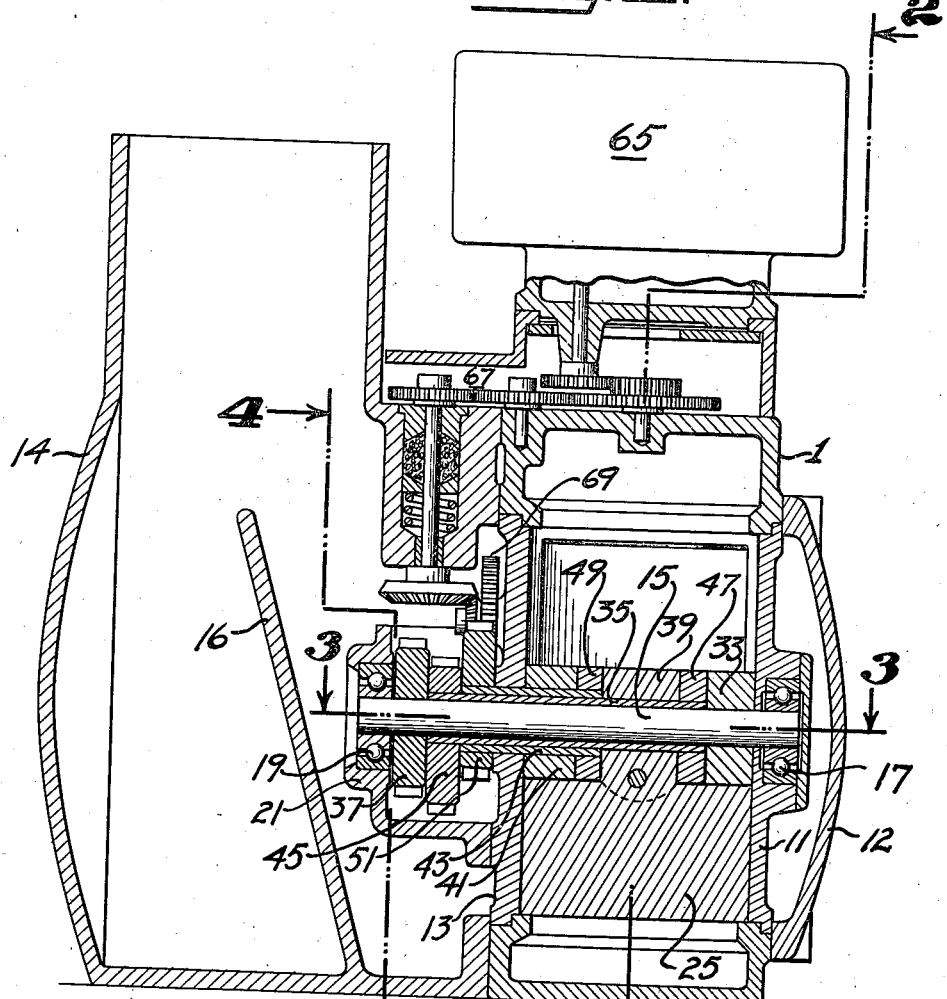
Figure 1 is a view in section through the meter, taken axially of the metering chamber.

The metering portion of the meter in which our present invention lies, comprises a casing 1 having a transverse metering chamber opening therethrough defined by a rear partition wall 3 and an interior adjustable front wall section 5, leaving an opening 7 at the bottom of the chamber to constitute the inlet opening thereto, and an opening 9 at the top to constitute the outlet opening. The outlet opening opens into a discharge passage normally blocked by a manually controlled valve 10 which must be held open to permit operation of the meter. The metering chamber is completed by disc closures 11 and 13 respectively groove fitted to each of the side walls of the casing. The closure 11 is maintained in its assembled position by a casing cap 12 suitably bolted to the container, while the closure 13 is clamped in position by an adjacent casing section 14. A baffle wall 16 is provided of a height sufficient to maintain the metering chamber full even during periods of inactivity.

This chamber houses a rotatable metering assembly. This assembly includes a supporting shaft 15 mounted at one end in a ball bearing 17 carried by the disc closure 11, and extends through and beyond the opposite disc closure 13 where its other end is mounted in a ball bearing 19 which is carried by the wall of a gear housing 21 supported from the closure 13.

The rotatable assembly further includes a plurality of blades 23, 25 and 27, in the embodiment disclosed and to be described. These blades are rotatable as a unit assembly while the angular velocity of each blade is caused to cyclically vary with respect to each other within the limits permitted and determined by the control mechanism associated with the rotatable assembly.

Figure 6:
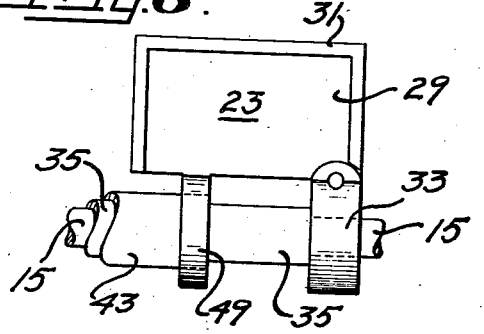

To realize the above operation, each blade is constructed to be mounted for independent rotational movement, while at the same time affording ample bearing support for each blade. One of the blades 23 will be of the construction illustrated in Figure 6, and comprises a rectangular blade section 29 having a thickened border or rim 31 bordering all sides except the side adjacent the shaft axis of the assembly. At one end of this side the blade is provided with a collar clamp 33 having an adjustable internal diameter sufficient to enable the blade to be clamped to the supporting shaft 15 adjacent the disc closure 11.

The supporting shaft 15 carries an intermediate sleeve 35 one end of which is in abutment against the clamp 33 of the blade just described, while the other end extends through the opposite disc closure 13 and terminates short of the ball bearing 19 in which the shaft 15 is mounted, thus exposing a portion of this supporting shaft 15 for the mounting of a gear 37 thereon in a manner to be subsequently described. The intermediate sleeve 35 is rotatable with respect to the supporting shaft 15 and constitutes a concentric shaft for the attachment of the second blade 25.

This second blade is similar in construction to the first described blade except for the mounting means which in this case comprises a clamp 39 disposed at the center of the edge facing the supporting shaft and is clamped to the intermediate sleeve midway between the two ends of the metering chamber, with its clamp in spaced relationship to the clamp 33, thus leaving a small portion of the intermediate sleeve exposed between the clamp 39 of this second blade and the clamp 33 of the first blade.

Figure 5:
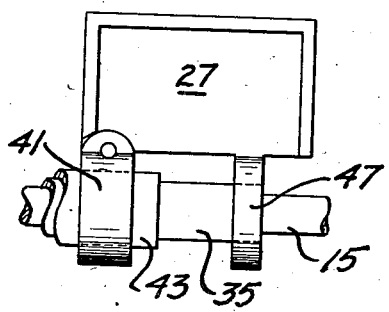
Figures 5 and 6 are elevational views of two of the blades embodied in the meter.

The third blade 27 is illustrated in Figure 5, and is similar to the previously described blades except for the mounting portions thereof. This blade has a clamping element 41 at one end thereof adjacent the opposite disc closure 13 of the metering chamber and is of adjustable diameter sufficient to enable the blade to be clamped to an outer sleeve 43 or concentric shaft which is rotatably mounted on the intermediate sleeve 35. The outer sleeve has one end in abutment against the clamp 39 of the second blade 25, while its other end extends through the disc closure 13 and terminates sufficiently short of the end of the intermediate sleeve to leave room for the mounting of a gear 45 on said intermediate sleeve. The width of the clamp 41 is such as to leave a portion of the outer sleeve 43 exposed between this clamp and the clamp 39 of the second blade described.

The portion of the intermediate sleeve 35 and the outer sleeve 43 exposed between the various clamping elements constitute bearing surfaces for the blades 27 and 23 respectively, each of which is provided with a bearing collar 47 and 49 respectively of a diameter to fit the exposed portion of the respective sleeve with which such bearing collar is associated. The outer sleeve 43 also has a gear 51 affixed thereto at its exposed end. All of the gears 37, 45 and 51 are alike in size and construction, each being eccentrically mounted on its respective shaft with the long axis of each gear in the plane of the blade with which it is associated.

The gear housing 21 carries a ball bearing mounted shaft 53 parallel to the concentric shafts. On this shaft is mounted a gear cluster 55 in which the gears 57, 59 and 61 are all similarly mounted eccentrically on the shaft and angularly displaced with respect to one another by 120°. To maintain these gears in this fixed relationship, they are all tied together by a plurality of rivets 63. This gear cluster is supported in engagement with the gears 37, 45 and 51 mounted on the concentric shafts. Although all the gears of the cluster must rotate in unison, the gears mounted on the respective concentric shafts are free to rotate independently of one another insofar as this is permitted and controlled by the gear cluster.

It will be noted now, that each gear of the gear cluster and the gear with which it is engaged constitutes a variable speed gear train. Consequently, during each rotation of the gear cluster, each of the gears associated with the concentric shafts will make one complete revolution, but during such revolution the angular velocity of such gear will be caused to vary cyclically, and accordingly such rotational characteristics will in turn be transmitted to the associated shaft and imparted to the blade connected thereto. To maintain proper meshing of the various gears and thereby realize smooth and efficient operation, the gears are elliptical in form with the shaft passing through one of the foci thereof. With this in mind, the operation of the metering assembly may well be discussed at this time.

Figure 2:
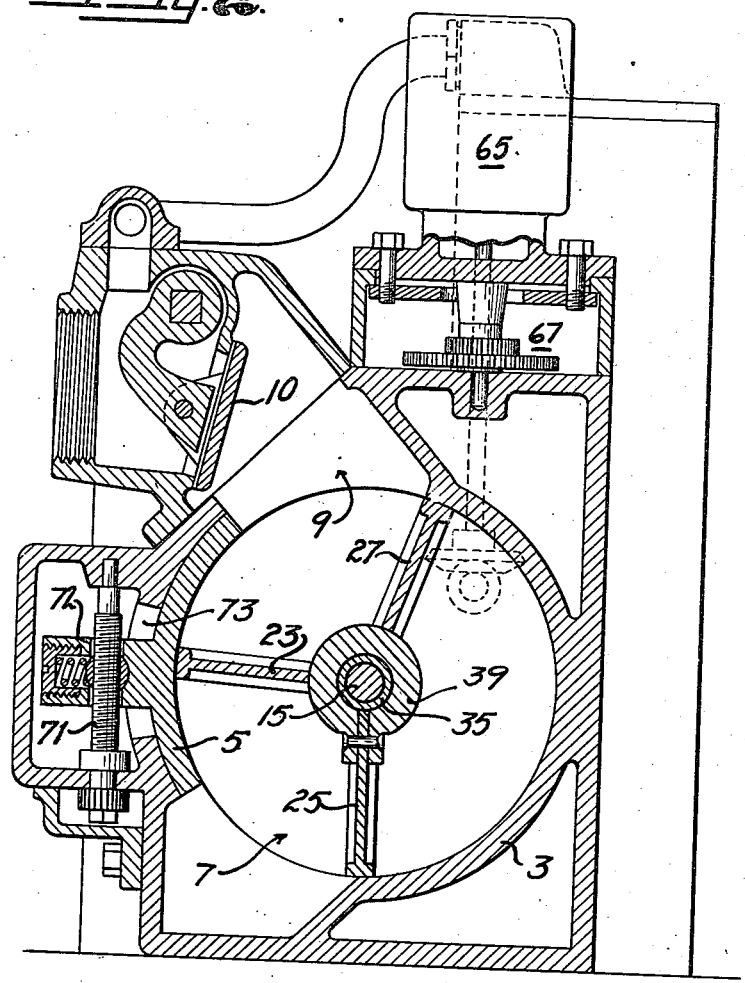
Figure 2 is a view in section along the line 2—2 of Figure 1.
Figure 7:
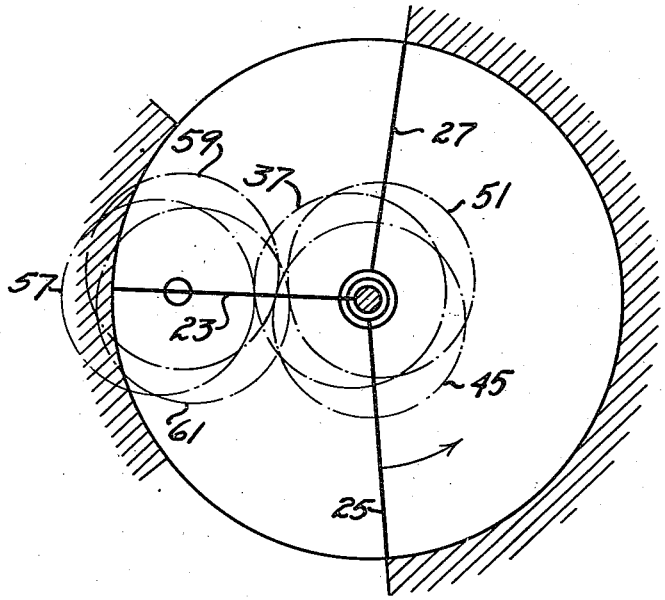
Figures 7 and 8 are schematic representations bringing out the relationship between the meter blades and the mechanism for controlling their cyclic angular velocity variations in the operation of the meter.

Fluid to be measured is first passed into casing 14. After such liquid rises in level to the upper edge of the baffle wall, it spills over and is then caused to enter the metering chamber through the inlet opening 7. Such liquid will strike against the rear surface of one of the blades causing such blade to move forward in counterclockwise direction as viewed in Figure 2. Such forward movement of the blade is transmitted to the shaft to which it is connected, and this shaft in turn will rotate the gear connected thereto and cause rotation of the gear cluster. The gear cluster being in rotation and in engagement with the other gears on the concentric shafts will retransmit movement through the remaining shafts to the other blades in the metering chamber whereby the entire assembly within the metering chamber will be caused to rotate as a unit assembly. At the same time however, due to the variable speed characteristics of the gear trains and the 120° displacement of the gears in the gear cluster, each of the blades will cyclically vary as to angular velocity during its movement about the axis of the shaft in the metering chamber, such cyclic variations of each blade being similar but 120° out of phase with one another. This will bring about an expansion and contraction of the chambers formed by the blades, and the arrangement is such that each chamber will reach its maximum volume at cut off on the intake side of the metering chamber, and will be reduced to its smallest volume at substantially the time of cut off on the discharge side of the metering chamber. The relationship between the control gears and the blades at the respective periods, when a compartment reaches its maximum volume and when the same compartment reaches its minimum volume is depicted schematically in Figures 7 and 8 respectively. Thus during intake, when the trailing blade of a compartment effects cut off at the inlet opening, the leading blade will have reached the discharge opening thus trapping a considerable volume of incoming liquid. This liquid upon further movement of the blades and due to contraction of the compartment which begins at substantially this point in its movement, starts discharging through the outlet of the meter and continues to so discharge as long as the compartment defined by the two blades is exposed in any portion thereof to the outlet opening.

Figure 8:
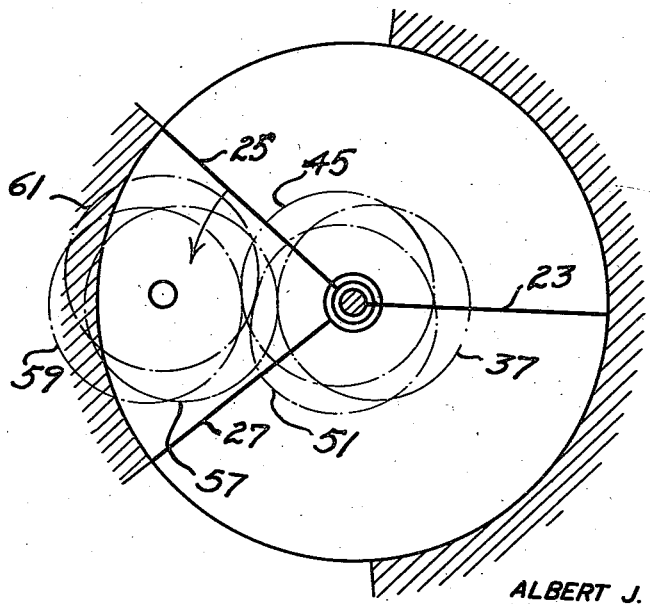

After the blades have proceeded sufficiently to reach the position indicated in Figure 8 where the trailing blade has effected cut off at the outlet opening and the compartment has reached its minimum volume, a certain amount of the liquid contents of the compartment will be trapped therein and will be returned to the intake side of the meter upon further rotational movement of the blades. The amount of liquid which this particular compartment discharges through the meter will therefore be the difference between that trapped in the compartment on the intake and that which is trapped in the compartment after passing the discharge opening and returned to the intake side of the meter. Inasmuch as the gears forming the control mechanism for the movement of the rotatable assembly are all similar, it follows that each pair of blades will define a compartment which will function in like manner with respect to the other compartments within the meter.

In order to measure or indicate the amount of liquid which is thus passed through the meter, a registering mechanism 65 supported upon the top of the casing 1 is connected through a suitable gear train 67 to one of the elliptic gears 51 to register the revolutions of the metering assembly in the metering chamber. In designing the meter, the compartments are given such capacity as to be capable of delivering a predetermined volume of liquid per revolution, and the gear train is designed to register such revolutions of the rotatable assembly in terms of gallons. Inasmuch as the angular velocity of this elliptic gear 51 is non-linear while the output of the meter is quite uniform and consequently linear, that gear 69 of the gear train to the indicator which engages the eccentrically mounted gear 51 is similar in construction to gear 51 and is mounted eccentrically in like manner, on a stub shaft 70 extending from the disc closure 13 and thus compensates for the non-linearity of rotation of the gear 51. The registering mechanism will therefore register in accordance with the output of the meter.

In the event that, due to manufacturing tolerances or to changes in viscosity of the liquid to be metered, it is found that the meter does not register accurately, the front wall section 5 of the metering chamber may be shifted between plus and minus limits to effectively increase or decrease the size of the discharge opening 9, thereby altering the time of cut off at the discharge opening, and thus enabling control of the discharge of the meter, within limits sufficient to compensate for inaccuracies due to the above causes. Such adjustment is affected through manipulation of an adjusting screw 71 which is in threaded engagement with a tail extension 72 of the adjustable wall section protruding through a slot 73 in the casing wall.

It will be apparent from the above description of our improved metering assembly, that it will fulfill the objects of our invention as previously set forth, it being noted that the compartments are entirely free of any obstruction thus giving the meter added capacity and at the same time simplifying its construction considerably. While we have described our invention in great detail, it will be apparent that the same might be modified without departing from the spirit thereof and we accordingly do not desire to be limited to the details of construction as set forth by us except as may be necessitated by the scope of the appended claims.

We claim:

1. A fluid meter or the like comprising three concentric shafts, each terminating short of each end of the shaft of next smaller diameter to expose end portions of such shaft of smaller diameter, a blade for each shaft, one of said blades being centrally and fixedly mounted adjacent one exposed end of the intermediate shaft, another of said blades being fixedly mounted on the adjacent end of the largest shaft and having a free bearing around the end of the intermediate shaft adjacent the mounting of the blade fixedly mounted thereon, the remaining blade being fixedly attached to the adjacent end of the smallest shaft and having a free bearing around the largest shaft adjacent the mounting of the blade fixedly mounted thereon, a chamber in which said blades rotate, said chamber having side walls bearing on the edges of said blades and a peripheral wall bearing against the outer edges of said blades and having inlet and outlet openings therein, the blade mounting end of said smallest diameter shaft being journaled in a main bearing in one of said side walls with all the shafts passing through the opposite of said side walls, an elliptical gear mounted on each of adjacent exposed ends of said shafts outside of said latter side wall, a second main bearing carried by a bearing hanger attached to said latter side wall and journaling the exposed end of the smallest diameter shaft, a second set of elliptical gears fixedly mounted on a shaft rotating on said latter side wall and said bearing hanger, and respectively meshing with the elliptical gears on said shafts, and an inlet conduit connected to said inlet opening and enclosing said gears.

2. Apparatus in accordance with claim 1 wherein a single additional elliptical gear is positioned in said inlet conduit meshed with one of the second set of elliptical gears, and connected to rotate a registering mechanism positioned outside of said inlet conduit.

ALBERT J. GRANBERG.
THOMAS A. McCOY.